(12) United States Patent
Iwasaki

(10) Patent No.: US 7,437,380 B2
(45) Date of Patent: Oct. 14, 2008

(54) TEXTURE GENERATING SYSTEM AND METHOD OF TEXTURE GENERATION

(75) Inventor: Taiji Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 302 days.

(21) Appl. No.: 10/948,550

(22) Filed: Sep. 24, 2004

(65) Prior Publication Data

US 2005/0097136 A1 May 5, 2005

(30) Foreign Application Priority Data

Sep. 24, 2003 (JP) ............................. 2003-332133

(51) Int. Cl.
*G06F 17/30* (2006.01)
(52) U.S. Cl. .................. 707/102; 707/104.1; 707/3; 707/2; 707/5
(58) Field of Classification Search .............. 707/104.1, 707/5, 2; 701/211
See application file for complete search history.

(56) References Cited

U.S. PATENT DOCUMENTS 5,363,475 A * 11/1994 Baker et al. ................. 345/422
5,898,407 A * 4/1999 Paulus et al. ................. 343/713
6,677,957 B2 * 1/2004 Grzeszczuk et al. ......... 345/582
6,735,557 B1 * 5/2004 Castellar et al. ................. 703/5
7,120,289 B2 * 10/2006 Baumberg ................. 382/154
7,120,311 B2 * 10/2006 Snyder ........................ 382/276
7,149,368 B2 * 12/2006 Tong et al. .................. 382/285
2004/0247515 A1 * 12/2004 Gardner .................... 423/447.2
2005/0041024 A1 * 2/2005 Green et al. ................. 345/426

OTHER PUBLICATIONS

"Tips on DTP & Graphic Design", Editorial Department of MdN, MdN Corporation, Apr. 1, 2003, p. 142.

* cited by examiner

*Primary Examiner*—Cam-Y Truong
*Assistant Examiner*—Shyue Jiunn Hwa
(74) *Attorney, Agent, or Firm*—Sughrue Mion, PLLC

(57) ABSTRACT

The method and system for generating texture of a target object acquire first information about a surface geometry and second information about a constituent material of the target object, and third information about a kind of incident light falling on a surface of the target object, preferably, from respective databases, calculates a intensity distribution of scattered light on the target object and in an area surrounding the target object using Maxwell's equations based on the first, the second and the third information, and calculates a two-dimensional intensity distribution of the scattered light at a specified angle to the surface of the target object as generated texture of the target object using the thus calculated intensity distribution of the scattered light.

13 Claims, 6 Drawing Sheets

TEXTURE GENERATING SYSTEM AND METHOD OF TEXTURE GENERATION

BACKGROUND OF THE INVENTION

This invention relates to a texture generating system by which the texture of a subject on a print that is output from an image output device can be generated in a simple but physically strict manner. The invention also relates to a method of such texture generation.

A technique in current practice is the use of computer graphics to represent patterns and other features of the texture of the surface of a subject (object) on a print that is output from an image output device. In this technique, the texture is produced on the basis of either an actual photo or the sensibility or experience of the creator (see, for example, "Tips on DTP & Graphic Design", Editorial Department of MdN, MdN Corporation, Apr. 1, 2003, p. 142.

The prior art of texture generation based on actual photos or the sensibility or experience of the creator not only lacks physical strictness but also has the problem of requiring experience and special knowledge in generating the intended texture.

SUMMARY OF THE INVENTION

The present invention has been accomplished in order to solve the aforementioned problems of the prior art and it has as an object providing a texture generating system by which even a person who is inexperienced and lacks special knowledge can generate the texture of an object's surface in an easy but physically strict manner. Another object of the invention is to provide a method of such texture generation.

In order to attain the object described above, the present invention provides a texture generating system that generates texture of a target object, comprising a database section comprising a first database in which first information about plural surface geometries of objects is registered, a second database in which second information about plural constituent materials of the objects is registered and a third database in which third information about plural kinds of incident light falling on a surface of a object is registered; a display section for displaying the first information about the plural surface geometries of the objects, the second information about the plural constituent materials of the objects and the third information about the plural kinds of the incident light, which are registered in the first database, the second database and the third database of the database section, respectively, as well as the texture of the object; selection input means for selecting the first information about a surface geometry corresponding to the target object from the first information about the plural surface geometries of the objects displayed on the display section, the second information about a constituent material of the target object from the second information about the plural constituent materials of the objects displayed on the display section and the third information about a kind of the incident light from the third information about the plural kinds of the incident light displayed on the display section; and a computing section for calculating, based on the first information about the surface geometry of the target object, the second information about the constituent material of the target object and the third information about the kind of the incident light which are selected by the selection input means and read out from the database section, a intensity distribution of scattered light on the target object and in an area surrounding the target object using Maxwell's equations as well as calculating a two-dimensional intensity distribution of the scattered light at a specified angle to an surface of the target object as generated texture of the target object using the thus calculated intensity distribution of the scattered light, wherein the two-dimensional intensity distribution of the scattered light calculated by the computing section is displayed on the display section as the generated texture of the target object.

Also, in order to attain the object described above, the present invention provides a texture generating system that generates texture of a target object, comprising a database section comprising at least one database selected from the group consisting of a first database in which first information about plural surface geometries of objects is registered, a second database in which second information about plural constituent materials of the objects is registered and a third database in which third information about plural kinds of incident light falling on a surface of a object are registered; a display section for displaying at least one of the first information about the plural surface geometries of the objects, the second information about the plural constituent materials of the objects and the third information about the plural kinds of the incident light, which is registered in at least one database of the database section as well as the texture of the object; input means for performing selection input by which at least one of the first information about a surface geometry corresponding to the target object, the second information about a constituent material of the target object and the third information about a kind of the incident light is selected from at least one displayed on the display section of the first information about the plural surface geometries of the objects, the second information about the plural constituent materials of the objects and the third information about the plural kinds of the incident light as well as directly inputting one or two remainders that are not selected among the first information about the surface geometry corresponding to the target object, the second information about the constituent material of the target object and the third information about the kind of the incident light when the one or two remainders are existed; and a computing section for calculating, based on the first information about the surface geometry of the target object, the second information about the constituent material of the target object and the third information about the kind of the incident light which are selected by the input means and read out from the database section or further inputted directly by the input means, a intensity distribution of scattered light on the target object and in an area surrounding the target object using Maxwell's equations as well as calculating a two-dimensional intensity distribution of the scattered light at a specified angle to an surface of the target object as generated texture of the target object using the thus calculated intensity distribution of the scattered light, wherein the two-dimensional intensity distribution of the scattered light calculated by the computing section is displayed on the display section as the generated texture of the target object.

Preferably, the input means comprises selection input means for performing the selection input and direct input means for directly inputting the one or two remainders.

Furthermore, in order to attain the object described above, the present invention provides a texture generating method for generating texture of a target object, comprising the steps of acquiring first information about a surface geometry of the target object; acquiring second information about a constituent material of the target object; acquiring third information about a kind of incident light falling on a surface of the target object; calculating a intensity distribution of scattered light on the target object and in an area surrounding the target object using Maxwell's equations based on the first information about the surface geometry of the target object, the second information about the constituent material of the target object and the third information about the kind of incident light; and calculating a two-dimensional intensity distribution of the scattered light at a specified angle to an surface of the target object as generated texture of the target object using the thus calculated intensity distribution of the scattered light, wherein the two-dimensional intensity distribution of the scattered light calculated by the computing section is generated as the texture of the target object.

Preferably, the step of acquiring the first information about the surface geometry of the target object is a step of selecting the first information about the surface geometry of the target object from a first database in which the first information about plural surface geometries of objects is registered.

Preferably, the step of acquiring the second information about the constituent material of the target object is a step of selecting the second information about the constituent material of the target object from a second database in which the second information about plural constituent materials of objects is registered.

Preferably, the second information about the constituent material of the target object comprises information on permittivity and permeability of the constituent material or information on refractive index of the constituent material.

Preferably, a step of acquiring the third information about the kind of the incident light falling on the surface of the target object is a step of selecting the third information about the kind of the incident light from a third database in which the third information about plural kinds of the incident light falling on a surface of an object is registered.

The texture generating system of the present invention is provided with at least one of the first to third databases in which the information about the surface geometry of an object, the information about the constituent material of the object and the information about the incident light are registered, respectively, to display on the display section the information about the surface geometry of the object, the information about the constituent material of the object and the information about the incident light. Therefore, even a person who is inexperienced and lacks special knowledge can select the information necessary to generate a texture. Furthermore, the texture generating system of the invention determines the intensity distribution of the scattered light on the object and in the surrounding area thereof using Maxwell's equations based on the information about the surface geometry of the object, the information about the constituent material of the object and the information about the incident light. As a result, a physically strict texture of the object's surface can be easily generated without requiring experience and special knowledge.

The texture generating method of the invention acquires the information about the surface geometry of an object, the information about the constituent material of the object and the information about the incident light falling on the object's surface and calculates the intensity distribution of the scatted light on the object and in the surrounding area thereof using Maxwell's equations based on the information about the surface geometry of the object, the information about the constituent material of the object and the information about the incident light. Therefore, it is possible to generate a physically strict texture of the object's surface.

In addition, the information about the surface geometry of the object, the information about the constituent material of the object and the information about the incident light falling on the object's surface is acquired from the first to third databases so that even a person who is inexperienced and lacks special knowledge can easily generate a texture of the object's surface.

This application claims priority on Japanese patent application No.2003-332133, the entire contents of which are hereby incorporated by reference.

DESCRIPTION OF THE PREFERRED EMBODIMENT

On the following pages, the texture generating system and the method of texture generation of the invention are described in detail with reference to the preferred embodiment shown in the accompanying drawings.

Figure 1:
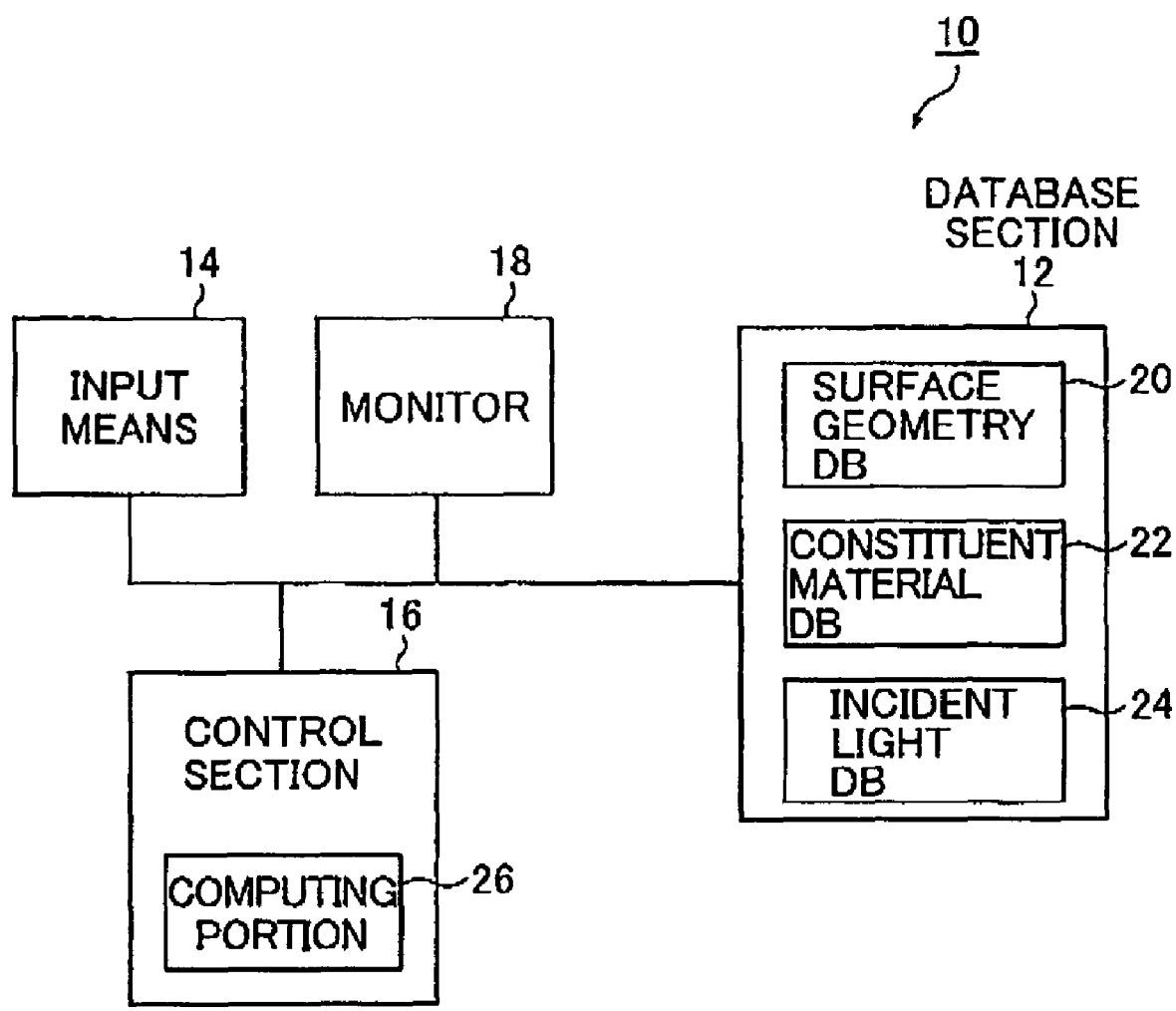
FIG. 1 is a schematic diagram showing a texture generating system according to a preferred embodiment of the present invention.

FIG. 1 is a schematic diagram showing the texture generating system according to the preferred embodiment of the present invention.

As shown in FIG. 1, the texture generating system 10 (hereunder referred to as the generating system 10) comprises a database section 12, input means 14, a control section 16, and a monitor (display section) 18.

The database section 12 comprises a surface geometry database 20 (the first database and hereunder designated surface geometry DB 20), a constituent material database 22 (the second database and hereunder designated constituent material DB 22), and an incident light database 24 (the third database and hereunder designated incident light DB 24).

The surface geometry DB 20 has registered in it plural pieces of information about the surface geometry of an object. The "surface geometry of an object" may be either a cross-sectional profile of the surface of the object or its three-dimensional representation.

FIGS. 2A-2F are schematic cross sections showing the surface geometries of various objects that are registered in the surface geometry DB according to the embodiment under consideration.

As FIGS. 2A-2F show, the generating system 10 according to the embodiment under consideration has the surface geometries of plural, say, six objects 30, 32, 34, 36, 38, 40 registered in the surface geometry DB 20. Letter p in FIGS. 2A-2F represents the profile of each of the objects 30, 32, 34, 36, 38, 40. Note that voids v are formed in object 40.

As will be described later, objects 30, 32, 34, 36, 38, 40 registered in the surface geometry DB 20 are displayed as image on the monitor 18 by means of the control section 16. Looking at the displayed objects 30, 32, 34, 36, 38, 40, the user chooses what he desires by manipulating, for example, the input means, 14.

In the embodiment under consideration, six objects are registered in the surface geometry DB 20 but this is not the sole case of the invention and it is preferred to register as many surface geometries as can be tolerated by the capacity of the generating system 10.

The constituent material DB 22 has registered in it the information about a plurality of constituent materials. The constituent material may be exemplified by a metal (e.g. aluminum or titanium), wood (e.g. veneer) and a nonmetal (e.g. glass or ceramics). The information about the constituent material is its permittivity and permeability or its refractive index. As will be described later, Maxwell's equations are used in the embodiment under consideration, so information will suffice if it is about refractive index or about both permittivity and permeability.

Figures 3A, 3B, 3C:
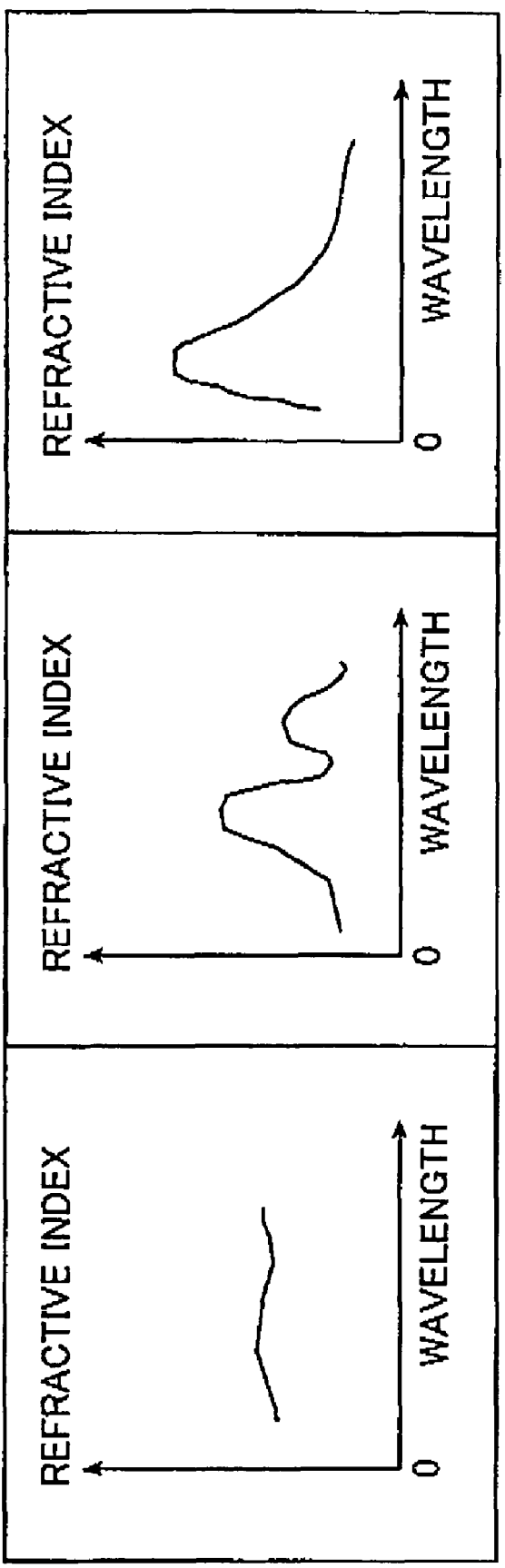
FIGS. 3A-3C are graphs that plot refractive index on the vertical axis and wavelength on the horizontal axis to show the information about various constituent materials.

FIGS. 3A-3C are graphs that plot refractive index on the vertical axis and wavelength on the horizontal axis to show the information about various constituent materials. As is clear from FIGS. 3A-3C, different Constituent materials have different refractive indices with varying wavelength dependency.

As will be described later, the constituent material's information registered in the constituent material DB 22 is displayed as, for example, graphs showing the wavelength dependency of refractive index by means of the control section 16. Looking at the displayed pieces of information about constituent materials, the user chooses what he desires by manipulating, for example, the input means 14. In other words, the refractive index associated with a particular constituent material is chosen.

In the embodiment under consideration, three pieces of constituent material's information are registered in the constituent material DB 22 but this is not the sole case of the invention and it is preferred to register as many pieces of constituent material's information as can be tolerated by the capacity of the generating system 10.

The constituent material's information may be specified for each constituent material by, for example, registering the information about titanium, glass or wood in the constituent material DB 22 in association with each constituent material and displaying the names of all constituent materials on the monitor 18, from which the user may choose the constituent material he desires. In this way, the user may find it even easier to obtain the texture of a particular object.

The incident light DB 24 has registered in it plural pieces of information about the incident light falling on the surface of an object. The information about the incident light may be given by the spectral distributions of light sources. Note that the angle of incidence may be included in the information about the incident light.

Figures 4A, 4B, 4C:
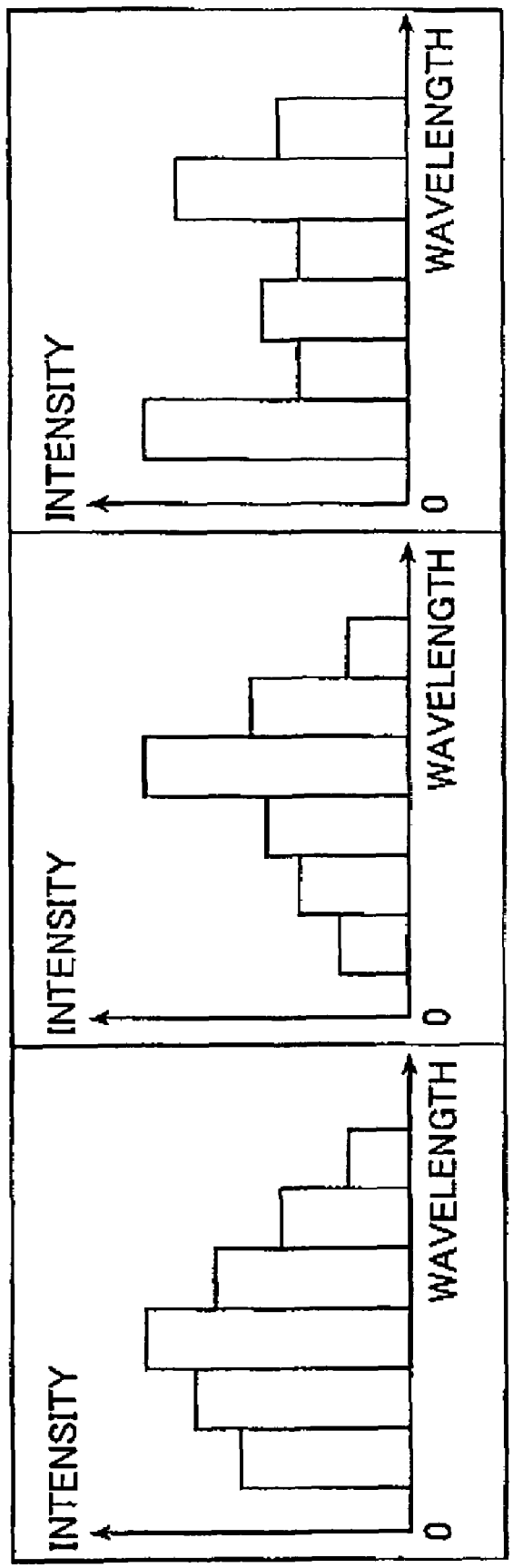
FIGS. 4A-4C are histograms that plot intensity on the vertical axis and wavelength on the horizontal axis to show the spectral distributions of various light sources.

FIGS. 4A-4C are histograms that plot intensity on the vertical axis and wavelength on the horizontal axis to show the spectral distributions of various light sources.

In the embodiment under consideration, three light sources having the wavelength distributions shown in FIGS. 4A-4C are registered in the incident light DB 24.

As will also be described later, the information about the incident light that is registered in the incident light DB 24 (see FIGS. 4A-4C) is displayed on the monitor 18 by means of the control section 16. Looking at the displayed pieces of information about the incident light, the user chooses what he desires by manipulating, for example, the input means 14. In other words, the user chooses the spectral distribution associated with the light source he desires.

In the embodiment under consideration, three pieces of information about the incident light are registered in the incident light DB 24 but this is not the sole case of the invention and it is preferred to register as many pieces of information about the incident light as can be tolerated by the capacity of the generating system 10.

The information about the incident light may be registered for each type of light source. For example, the information about the incident light may be registered in the incident light DB 24 in association with various types of light sources including standard light source A, standard light source $D_{65}$, common light source $D_{65}$, common light source $D_{50}$, common light source $D_{55}$ and common light source $D_{75}$ which are specified in JIS Z8720, as well as the fluorescent lamp and the incandescent lamp (emitting tungsten light having a color temperature of 3200 K) which are specified in JIS Z9112-1990. If desired, the angle of incidence of the incident light may also be registered.

In the case under consideration, buttons associated with the kinds of light source that are registered in the incident light DB 24 may be displayed on the monitor 16 such that the user can select the button he desires by a suitable input means such as a mouse. If desired, the angle of incidence may be added as an item that can be selected. In this way, the user may find it even easier to obtain the texture of a particular object.

In the embodiment under consideration, the database section 12 is designed to have three databases, surface geometry DB 20, constituent material DB 22 and incident light DB 24, but this is not the sole case of the invention. As far as the purpose of the embodiment under consideration is concerned, it suffices that at least one of the three databases, surface geometry DS 20, constituent material DB 22 and incident light DB 24, is provided in the database section 12.

The input means 14 is a device the user manipulates to enter the angle of incidence at which the light from a light source falls on the surface of an object and it may be composed of a mouse and a keyboard.

As mentioned in the preceding paragraph, it suffices for the purposes of the present invention that at least one of the three databases, i.e., surface geometry DB 20, constituent material DB 22 and incident light DB 24, is provided in the database section 12. Hence, among the three kinds of information, i.e., the information about surface geometry, the information about constituent material and the information about incident light, one or more kinds of information will not be input into a computing portion 26 to be described later. If this occurs, the information registered in any database that is not provided which may be surface geometry DB 20 or constituent material DB 22 or incident light DB 24 is input into the computing portion 26 by the user who manipulates the input means 14. If desired, the input means 14 may also be manipulated to input the angle of incidence of the incident light or the direction at which the object is viewed.

The control section 16 which controls the database section 12, the input means 14 and the monitor 18 is furnished with the computing portion 26.

The control section 16 controls the database section 12 (comprising surface geometry DB 20, constituent material geometry DB 22 and incident light DB 24) such that the information about the surface geometry of a particular object, the information about the constituent material of the object and the information about the incident light are output to the computing portion 26.

The control section 16 also controls the monitor 18 such that it displays the information about surface geometry as registered in surface geometry DB 20 in the database section 12 (see FIGS. 2A-2F), the information about constituent material as registered in constituent material DB 22 (see FIGS. 3A-3C) and the information about incident light as registered in incident light DB 24 (see FIGS. 4A-4C).

On the basis of the supplied information, i.e., the information about the surface of a particular object, the information about the constituent material of the object and the information about the incident light falling on the object, the computing portion 26 calculates the intensity distribution of scattered light on the surface of the object and a specified surrounding area by the following Maxwell's equations (1)-(4). Equation (5) shows how refractive index is related to permittivity and permeability.

$$\mathrm{div} D = \rho \qquad \text{Equation 1}$$

$$\mathrm{rot}\, E = -\frac{\partial B}{\partial t} \qquad \text{Equation 2}$$

$$\mathrm{div} B = 0 \qquad \text{Equation 3}$$

$$\mathrm{rot}\, H = i + \frac{\partial D}{\partial t} \qquad \text{Equation 4}$$

$$n = \sqrt{\epsilon \mu / (\epsilon_0 \mu_0)} \qquad \text{Equation 5}$$

where D is electric flux density, $\rho$ is true electric charge density, E is the intensity of an electric field, B is magnetic flux density, H is the intensity of a magnetic field, i is conduction current density, n is refractive index, $\epsilon$ is permittivity, $\mu$ is permeability, $\epsilon_0$ is permittivity in a vacuum, and $\mu_0$ is permeability in a vacuum.

The computing portion 26 is furnished with a memory unit (not shown) for storing the information supplied from the database section 12 or the input means 14, i.e., the information about the surface of a particular object, the information about the constituent material of the object and the information about the incident light falling on the object, and all kinds of information that are necessary for calculating the intensity distribution of scattered light, i.e., the information about the surface of a single object, the information about the constituent material of the object and the information about the incident light falling on the object, are collectively stored in the memory unit.

Various methods can be employed in the computing portion 26 to calculate the intensity distribution of scattered light on the surface of the object and they include, for example, the finite difference time domain (FDTD) method, the finite element method and the boundary element method.

In the embodiment under consideration, the computing portion 26 employs the chosen method of calculation to construct a mesh model that represents the object having the specified surface geometry as selected, its surface and the surrounding area. Then, on the basis of the information about the surface of that object, the information about the constituent material of the object and the information about the incident light falling on the object, the computing portion 26 calculates the intensity distribution of the scattered light for the constructed mesh model using the Maxwell's equations. This provides a three-dimensional intensity distribution of the scattered light.

The computing portion 26 further processes the obtained three-dimensional intensity distribution of scattered light to calculate a two-dimensional intensity distribution of the scattered light at a specified angle to the surface of the object. This can provide a physically strict texture of the object.

The control section 16 controls the monitor 18 to display the texture of the object's surface as finally obtained in the computing portion 26.

The monitor 18 is not limited in any particular way as long as it has such a capability that the information about surface geometry as registered in surface geometry DB 20 in the database section 12 (see FIGS. 2A-2F), the information about constituent material as registered in constituent material DB 22 (see FIGS. 3A-3C) and the information about incident light as registered in incident light DB 24 (see FIGS. 4A-4C) can be displayed as, for example, image. Examples of the monitor 18 include CRT, LCD, PDP and an organic EL display.

In the generating system 10 of the embodiment under consideration, the intensity distribution of the scattered light on the surface of an object is calculated using Maxwell's equations, so the user can obtain a physically strict intensity distribution of the scattered light on the object's surface. In addition, all kinds of information that are registered in the database section, i.e., the information about surface geometry, the information about constituent material and the information about incident light are displayed on the monitor and the necessary information can be selected from the display screen, thus providing ease in obtaining the desired intensity distribution of scattered light. Further, on the basis of the obtained intensity distribution of scattered light, a two-dimensional intensity distribution of scattered light is calculated for the direction in which the surface of the object is viewed at a specified angle; this contributes to providing ease in obtaining a physically strict texture of the object's surface.

We now describe the method of texture generation in the embodiment under consideration.

Figure 5:
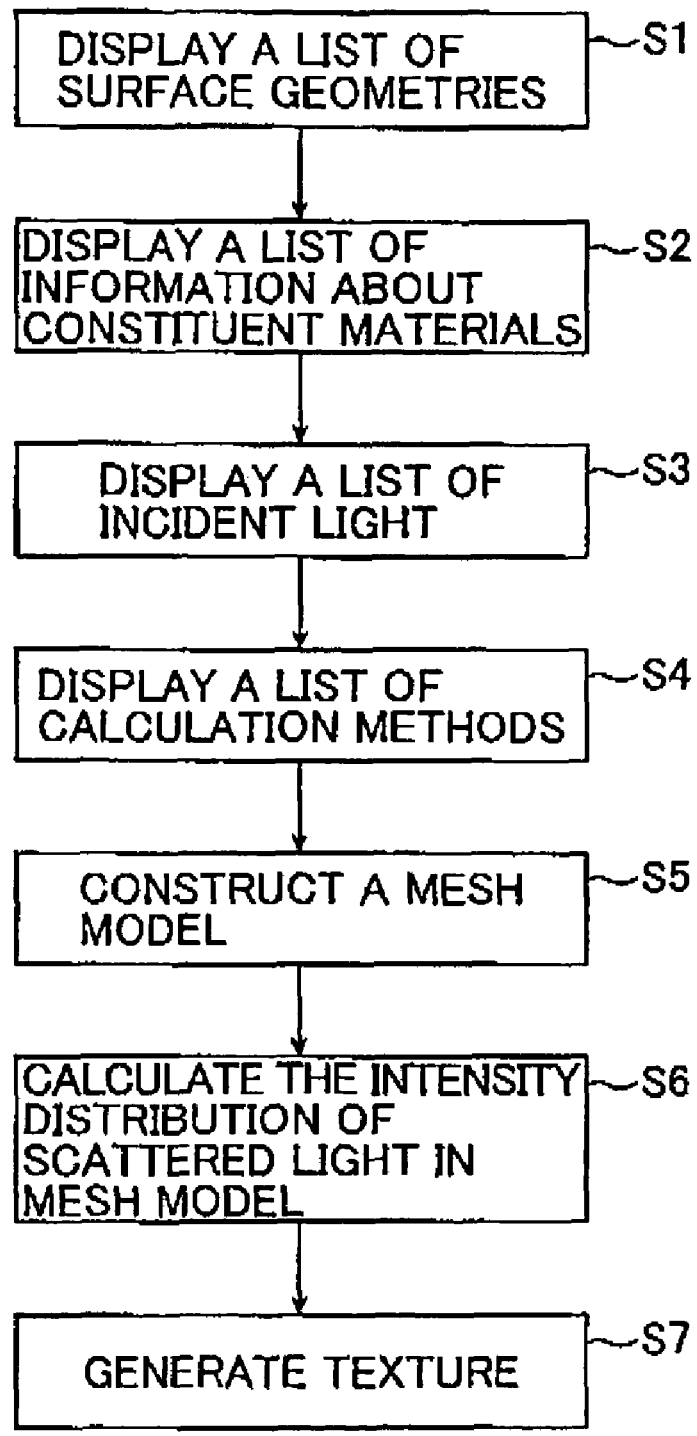
FIG. 5 is a flowchart showing the sequence of steps in a method of texture generation according to the preferred embodiment of the invention.

FIG. 5 is a flowchart showing the sequence of steps in the method of texture generation according to the preferred embodiment of the invention.

As FIG. 5 shows, the method starts with step S1 in which the control section 16 (see FIG. 1) controls the monitor 18 (see FIG. 1) to display a list of surface geometries that are registered in surface geometry DB 20 (see FIGS. 2A-2F).

Figure 2A:
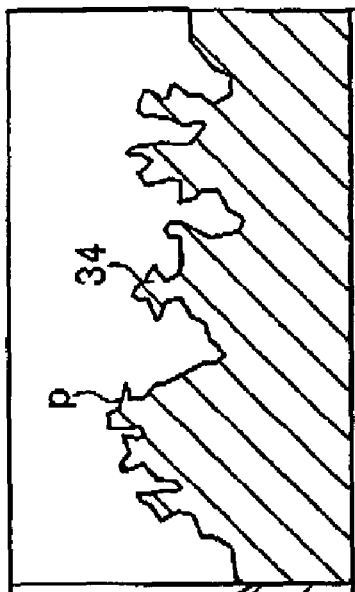
FIGS. 2A-2F are schematic cross sections showing the surface geometries of various objects that are registered in a surface geometry database.
Figure 2B:
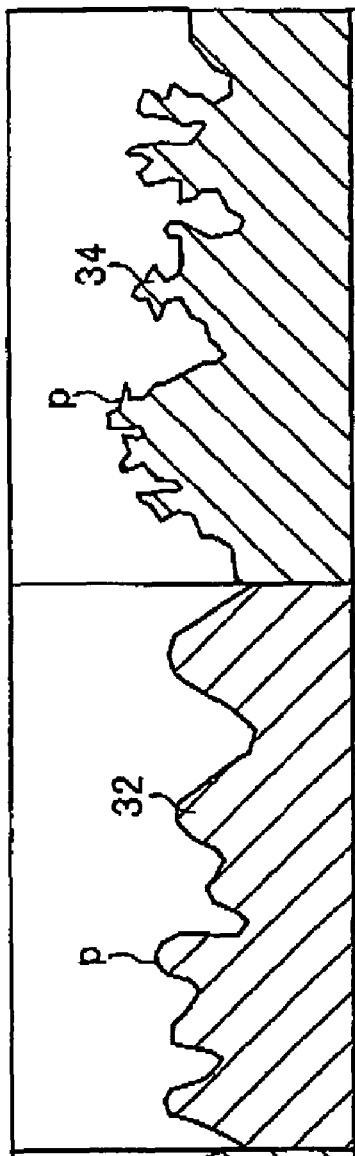
Figure 2C:
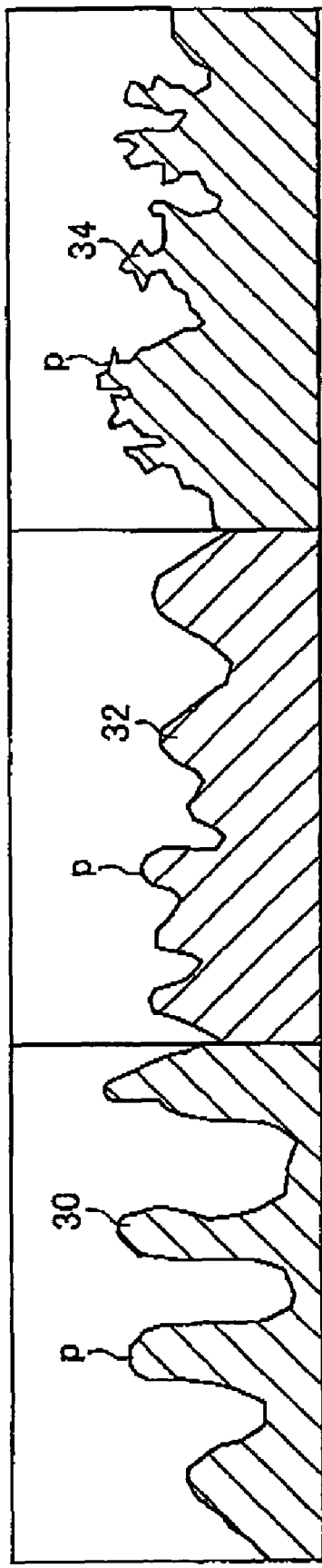
Figure 2D:
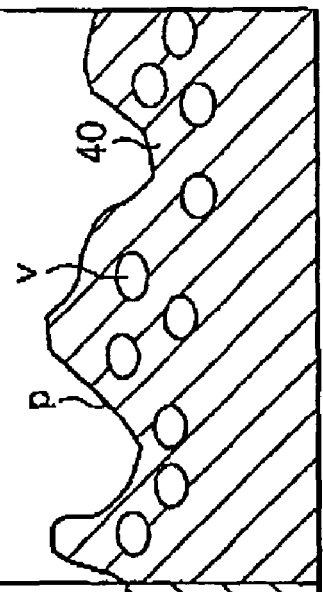
Figure 2E:
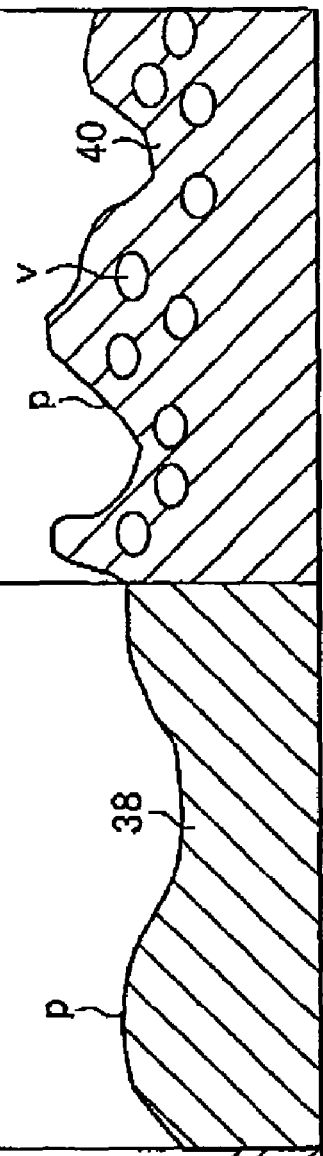
Figure 2F:
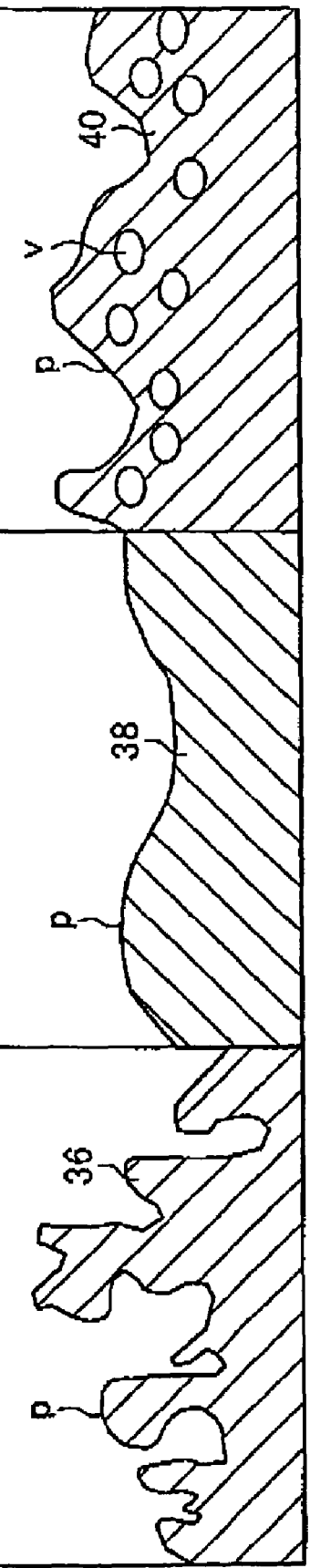

Then, looking at the list of surface geometries as displayed on the monitor 18, the user manipulates the input means 14 to select a desired object, for example, object 34 shown in FIG. 2C. The information about the surface geometry of the selected object 34 is output to the computing portion 26, where it is stored.

In next step S2, the control section 16 controls the monitor 18 to display a list of the information about constituent material as registered in constituent material DB 22 (see FIGS. 3A-3C).

Then, looking at the list of the information about constituent material that is displayed on the monitor 18, the user manipulates the input means 14 to select a suitable constituent material, for example, the one shown in FIG. 3A. The selected constituent material is stored in the computing portion 26 in relation to the object 34.

In next step S3, the control section 16 controls the monitor 18 to display a list of the information about incident light that is registered in incident light DB 24 (see FIGS. 4A-4C).

Then, looking at the list of the information about incident light as displayed on the monitor 18, the user manipulates the input means 14 to select suitable incident light, for example, the one having the spectral distribution shown in FIG. 4B. The angle of incidence of the incident light is also input.

The selected incident light and its angle of incidence are stored in the computing portion 26 in relation to the object 34.

In next step S4, the control section 16 controls the monitor 18 to display a list of the calculation methods (the list not shown) that can be implemented by the computing portion 26. In the embodiment under consideration, the FDTD method, the finite element method and the boundary element method may be displayed.

Then, looking at the list of the calculation methods as displayed on the monitor 16, the user manipulates the input means 14 to select a desired calculation method. The selected calculation method is stored in the computing portion 26 in association with the object 34.

Among the three calculation methods mentioned above, the FDTD method is preferably selected for a cubic mesh. If a higher precision in calculation is required, the finite element method is preferably selected. In the case of a larger object, the boundary element method is preferably selected.

In next step S5, a mesh model is constructed for the selected object 34 such that analysis can be made on the basis of the selected calculation method.

Figure 6:
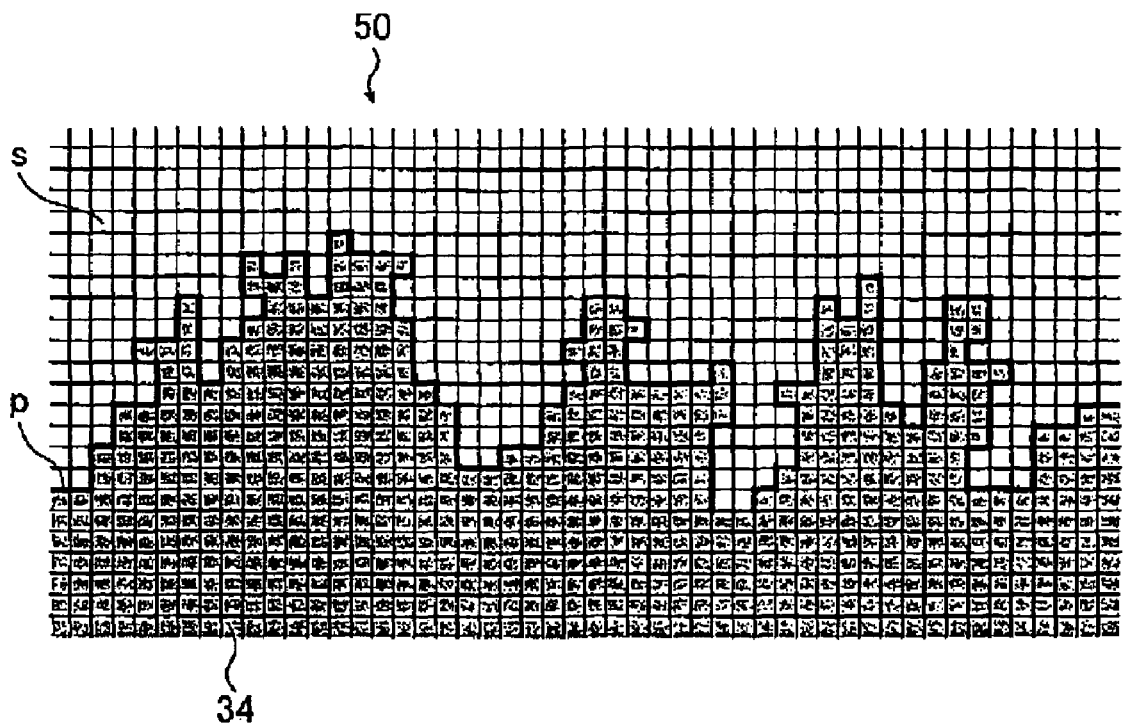
FIG. 6 is a schematic cross section showing a mesh model on which the finite difference time domain method or the finite element method is to be performed in the preferred embodiment of the invention.

FIG. 6 is a schematic cross section showing a mesh model on which the FDTD method or the finite element method is to be performed in the embodiment under consideration.

As is clear from FIG. 6, in the FDTD method and the finite element method, the mesh model 50 together with the object 34 and the surrounding area s may be divided by square elements in an orthogonal coordinate system. The spacing between adjacent intersections of the mesh is preferably no more than a tenth of the shortest wavelength of the incident light.

Note that FIG. 6 is a cross section and the object 34 and its surrounding area s are in fact divided by cubic elements.

Also note that in the finite element method, the dividing elements are not limited to those in an orthogonal coordinate system and dividing elements in an oblique coordinate system may be substituted.

Figure 7:
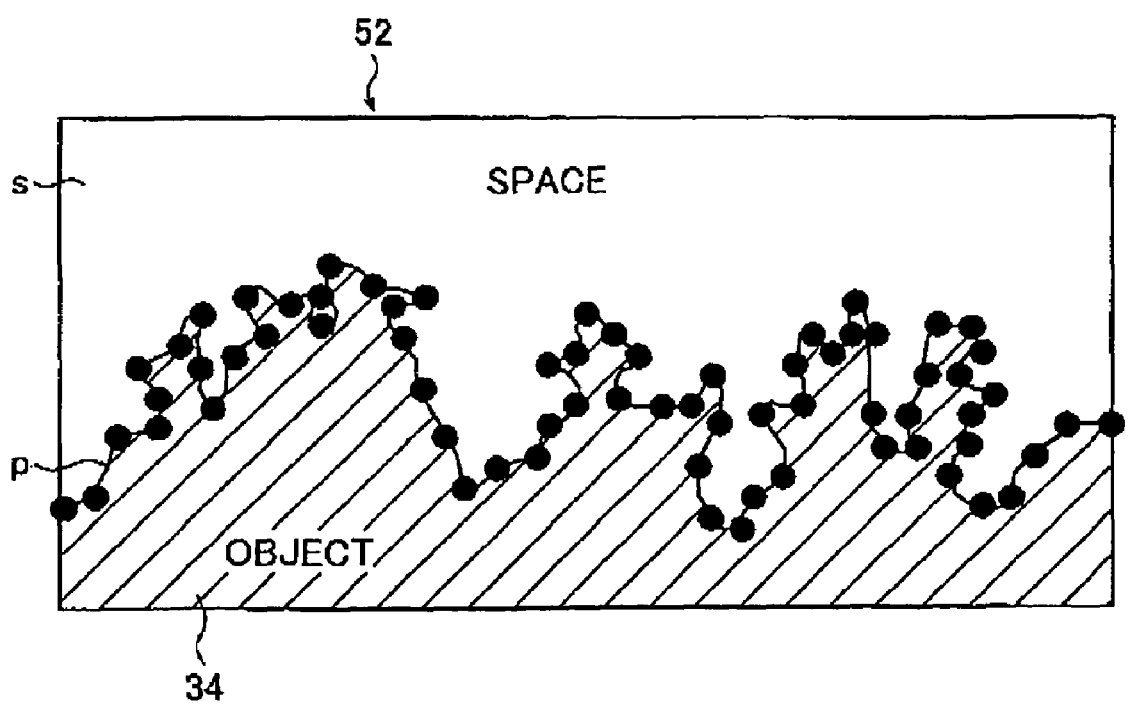
FIG. 7 is a schematic cross section showing a mesh model on which the boundary element method is to be performed in the preferred embodiment of the invention.

As FIG. 7 shows, if the boundary element method is employed, the profile p of the object 34 may be divided by discrete nodal points indicated by solid circles to construct a mesh model 52.

The method of constructing mesh models also is not limited in any particular way and any known methods of mesh model construction may be employed.

In next step S6, the intensity distribution of scattered light in the space model is calculated using Maxwell's equations. This provides an intensity distribution of the scattered light on the surface of the object 34 and in the surrounding area s. The obtained intensity distribution of the scattered light is a three-dimensional intensity distribution.

The method of calculating the intensity distribution of scattered light is not limited in any particular way and various known methods of numeric analysis may be implemented on the basis of selection from among the FDTD method, the finite element method and the boundary element method.

The next step is S7, in which the user manipulates the input means 14 to input the viewing direction as an angle to the surface of the object 34 and a two-dimensional intensity distribution of the scattered light at the input angle (viewing direction) with respect to the surface of the object 34 is determined to generate the texture of the object.

Thus, in the embodiment under consideration, the information necessary for texture generation is selected from the items displayed on the monitor 18 and combined with two other inputs, i.e., the angle of incidence of incident light and the direction of viewing the surface of the object; as a result, a physically strict texture of the object can be easily generated without requiring experience and special knowledge.

Described above are the basic features of the present invention. While the texture generating system and the method of texture generation according to the invention have been described above in detail, it should be understood that the invention is by no means limited to the foregoing embodiment and various improvements or modifications can of course be made without departing from the scope and spirit of the invention.

What is claimed is:

1. A texture generating system that generates texture of a target object, the system comprising:
   a database section comprising a first database in which first information about plural surface geometries of objects is registered, a second database in which second information about plural constituent materials of the objects is registered and a third database in which third information about plural kinds of incident light falling on a surface of an object is registered;
   a display section for displaying said first information about said plural surface geometries of the objects, said second information about said plural constituent materials of the objects and said third information about said plural kinds of the incident light, which are registered in said first database, said second database and said third database of said database section, respectively, as the texture of the target object;
   selection input means for selecting said first information about a surface geometry corresponding to said target object from said first information about said plural surface geometries of the objects displayed on said display section, said second information about a constituent material of said target object displayed on said display section, and said third information about a kind of the incident light displayed on said display section; and
   a computer for calculating, based on said first information about said surface geometry of said target object, said second information about said constituent material of said target object and said third information about said kind of the incident light which are selected by said selection input means and read out from said database section, a intensity distribution of scattered light on said target object and in an area surrounding said target object using Maxwell's equations as calculating a two-dimensional intensity distribution of said scattered light at a specified angle to an surface of said target object as generated texture of said target object using the calculated intensity distribution of said scattered light,
   wherein said two-dimensional intensity distribution of said scattered light calculated by said computing section is displayed on said display section as said generated texture of said target object.

2. The texture generating system according to claim 1, wherein the calculated intensity distribution of scattered light on said target object and in an area surrounding said target object is a three-dimensional intensity distribution.

3. The texture generating system according to claim 2, wherein the computing section calculates the three-dimensional intensity distribution by using a mesh model which represents said target object and a space of the area surrounding said target object, the mesh model constituted of mesh elements which divide regions of said target object and said space.

4. The texture generating system according to claim 2, wherein the computing section calculates the three-dimensional intensity distribution by using a model which represents said target object surface with points, based on a boundary element algorithm.

5. A texture generating system that generates texture of a target object, the system comprising:
- a database section comprising at least one database selected from a group consisting of a first database in which first information about plural surface geometries of objects is registered, a second database in which second information about plural constituent materials of the objects is registered and a third database in which third information about plural kinds of incident light falling on a surface of an object are registered;
- a display section for displaying at least one of said first information about said plural surface geometries of the objects, said second information about said plural constituent materials of the objects and said third information about said plural kinds of the incident light, each of first information, second information and third information being registered in at least one database of said database section;
- input means for performing selection input, wherein at least one of said first information about a surface geometry corresponding to said target object, said second information about a constituent material of said target object and said third information about a kind of the incident light is selected from at least one displayed on said display section of said first information about said plural surface geometries of the objects, said second information about said plural constituent materials of the objects and said third information about said plural kinds of the incident light as directly inputting one or two remainders that are not selected among said first information about said surface geometry corresponding to said target object, said second information about said constituent material of said target object and said third information about said kind of the incident light when said one or two remainders are existed; and
- a computer for calculating, based on said first information about said surface geometry of said target object, said second information about said constituent material of said target object and said third information about said kind of the incident light which are selected by said input means and read out from said database section or further inputted directly by said input means, a intensity distribution of scattered light on said target object and in an area surrounding said target object using Maxwell's equations as calculating a two dimensional intensity distribution of said scattered light at a specified angle to an surface of said target object as generated texture of said target object using the calculated intensity distribution of said scattered light,
- wherein said two-dimensional intensity distribution of said scattered light calculated by said computing section is displayed on said display section as said texture of said target object.

6. The texture generating system according to claim 5, wherein said input means comprises selection input means for performing said selection input and direct input means for directly inputting said one or two remainders.

7. The texture generating system according to claim 5, wherein the calculated intensity distribution of scattered light on said target object and in an area surrounding said target object is a three-dimensional intensity distribution.

8. The texture generating system according to claim 7, wherein the computing section calculates the three-dimensional intensity distribution by using a mesh model which represents said target object and a space of the area surrounding said target object, the mesh model constituted of mesh elements which divide regions of said target object and said space.

9. The texture generating system according to claim 7, wherein the computing section calculates the three-dimensional intensity distribution by using a model which represents said target object surface with points, based on a boundary element algorithm.

10. A texture generating method for generating texture of a target object, comprising the steps of:
- acquiring first information about a surface geometry of said target object, wherein the acquiring first information comprises selecting said first information about said surface geometry of said target object from a first database in which said first information about plural surface geometries of objects is registered;
- acquiring second information about a constituent material of said target object; wherein the acquiring second information comprises selecting said second information about said constituent material of said target object from a second database in which said second information about plural constituent materials of objects is registered and said second information about said constituent material of said target object comprises information on permittivity and permeability of said constituent material or information on refractive index of said constituent material;
- acquiring third information about a kind of incident light falling on a surface of said target object; wherein the acquiring third information comprises selecting said third information about said kind of the incident light from a third database in which said third information about plural kinds of the incident light falling on a surface of an object is registered;
- calculating a intensity distribution of scattered light on said target object and in an area surrounding said target object using Maxwell's equations based on said first information about said surface geometry of said target object, said second information about said constituent material of said target object and said third information about said kind of incident light; and
- calculating a two-dimensional intensity distribution of said scattered light at a specified angle to an surface of said target object as generated texture of said target object using the calculated intensity distribution of said scattered light,
- wherein said two-dimensional intensity distribution of said scattered light calculated by a computing section is generated as said texture of said target object.

11. The texture generating method according to claim 10, wherein the calculated intensity distribution of scattered light on said target object and in an area surrounding said target object is a three-dimensional intensity distribution.

12. The texture generating method according to claim 11, wherein the three-dimensional intensity distribution is calculated by using a mesh model which represents said target object and a space of the area surrounding said target object, the mesh model constituted of mesh elements which divide regions of said target object and said space.

13. The texture generating method according to claim 11, wherein the three-dimensional intensity distribution is calculated by using a model which represents said target object surface with points, based on a boundary element algorithm.

* * * * *